(12) United States Patent
Maynard

(10) Patent No.: US 12,041,923 B2
(45) Date of Patent: Jul. 23, 2024

(54) FISH FINDING TRANSDUCER LIFTER

(71) Applicant: Marc L. Maynard, Spencerport, NY (US)

(72) Inventor: Marc L. Maynard, Spencerport, NY (US)

( * ) Notice: Subject to any disclaimer, the term of this patent is extended or adjusted under 35 U.S.C. 154(b) by 527 days.

(21) Appl. No.: 17/220,057

(22) Filed: Apr. 1, 2021

(65) Prior Publication Data

US 2022/0312754 A1    Oct. 6, 2022

(51) Int. Cl.
*A01K 97/12* (2006.01)
*A01K 97/00* (2006.01)
*G01S 1/74* (2006.01)

(52) U.S. Cl.
CPC ............ *A01K 97/125* (2013.01); *A01K 97/00* (2013.01); *G01S 1/751* (2019.08)

(58) Field of Classification Search
CPC ...... A01K 97/01; A01K 97/00; A01K 97/125; A01K 97/12; G01S 1/751; G01S 1/752; G01S 1/75; G01S 1/74; G01S 15/96; G01S 7/62; A47B 96/06; A47B 7/521
See application file for complete search history.

(56) References Cited

U.S. PATENT DOCUMENTS

| | | | | |
|---|---|---|---|---|
| 2,773,326 | A * | 12/1956 | Calvert ................ | A01K 97/01 43/16 |
| 4,941,278 | A * | 7/1990 | Verkuil ................ | A01K 97/11 43/15 |
| 5,140,767 | A * | 8/1992 | Traut .................... | A01K 97/01 210/470 |
| 5,253,220 | A * | 10/1993 | Wilson, Sr. ........... | G01S 15/96 43/17.1 |
| 5,495,689 | A * | 3/1996 | Cassem ................. | G01S 15/96 43/17.1 |
| 5,501,028 | A * | 3/1996 | Hull ..................... | A01K 97/12 43/17 |
| 6,715,230 | B1 * | 4/2004 | Klein .................... | A01K 97/10 43/54.1 |
| 7,036,267 | B2 * | 5/2006 | Klein .................... | A01K 97/10 43/54.1 |
| 7,230,882 | B2 * | 6/2007 | Swisher ................ | F16B 9/056 367/173 |
| 7,746,727 | B2 * | 6/2010 | Bacarella .............. | A01K 97/01 367/173 |
| 8,028,947 | B1 * | 10/2011 | Schafer ................. | A01K 97/01 242/375.1 |
| 8,497,778 | B1 * | 7/2013 | Martin .................. | A01K 97/01 242/223 |
| 9,179,658 | B2 * | 11/2015 | Galbraith .............. | A01K 97/01 |
| 10,136,627 | B1 * | 11/2018 | Schumacher ......... | A01K 91/06 |
| 10,631,530 | B1 * | 4/2020 | Peterman .............. | A01K 97/01 |
| 10,653,125 | B2 * | 5/2020 | Mann ................... | A01K 97/01 |

(Continued)

*Primary Examiner* — Nkeisha Smith
(74) *Attorney, Agent, or Firm* — Michael J. Nickerson

(57) ABSTRACT

An electronic fish finder transducer lifting system includes a mechanical actuating device; a transducer lifting device; an electronic fish finder attachment member, rotatably connected to the transducer lifting device, configured to attach to an electronic fish finder; and a mechanical linkage, connected to the mechanical actuating device and the transducer lifting device, configured to transfer force, applied to the mechanical actuating device, to the transducer lifting device to lift a front portion of the transducer lifting device.

16 Claims, 11 Drawing Sheets

(56) References Cited

U.S. PATENT DOCUMENTS

| | | | | |
|---|---|---|---|---|
| 10,952,422 | B1* | 3/2021 | Carlson | A01K 97/01 |
| 11,134,665 | B2* | 10/2021 | Dresch | A01K 97/01 |
| 11,457,619 | B2* | 10/2022 | Tanner | A01K 97/01 |
| 2012/0131841 | A1* | 5/2012 | Galbraith | A01K 97/01 43/16 |
| 2017/0059314 | A1* | 3/2017 | Braunberger | A01K 91/06 |
| 2021/0352883 | A1* | 11/2021 | Zhu | G06F 3/013 |
| 2021/0364636 | A1* | 11/2021 | Simonton | G01S 15/96 |
| 2022/0018958 | A1* | 1/2022 | Wagner | G01S 15/96 |

* cited by examiner

FISH FINDING TRANSDUCER LIFTER

BACKGROUND

It is common practice to utilize an electronic fish finder when ice fishing to increase the likelihood of catching a fish. Unlike regular fishing, where the angler may be able to cast the line (bait) in different directions and different distances, ice fishing limits the placement of the bait to a single location, the hole in the ice. Thus, if the fish is ten yards from the hole in the ice, the fish may never encounter the bait and the angler may be unaware that a fish is in close proximity but not under the hole in the ice.

To counter the limitations of ice fishing, anglers usually cut multiple holes in the ice to realize a greater coverage of the fish's habitat. The angler then proceeds to go from hole to hole, dropping in a line in hopes of hooking a fish.

When using an electronic fish finder, the angler will drop the transducer of the electronic fish finder into the hole with the line. The electronic fish finder will inform the angle whether the current hole in the ice is near any fish. If the electronic fish finder does not mark any fish, the angler can remove the transducer and the line and proceed to the next hole.

However, if the angler does hook a fish and the transducer is still in the hole, the angler needs to remove the transducer from the hole before trying to reel-in the fish or risk the chance that the line chaffs against (or tangles around) the cable of the transducer, thereby weakening the strength of the line and increasing the chances of the line breaking and losing the fish.

However, when removing the transducer from the hole, the angler risks lessening the tension on the line, thereby increasing the chances that the fish spits out the hook and losing the fish.

FIG. 1 illustrates a conventional system to address the problem associated with the transducer being still in the hole when an angler hooks a fish. As illustrated in FIG. 1, an electronic fish finder 10 includes a transducer 15 and a corresponding cable 12, which provides both a physical and electronic connection between the electronic fish finder 10 and transducer 15.

To remove from the hole in the ice, as illustrated in FIG. 1, the cable 12 is connected to an electric motor 14, which "reels" in the transducer 15 from the hole upon activation of the electric motor 14. The electric motor 14 drives a reel (not shown), around which the cable 12 is wrapped. The electric motor 14 is located on a stand 13 that provides stability for the electric motor 14 and houses a battery (not shown) that powers the electric motor 14. The electric motor 14 is activated by a remote switch 11.

In using the conventional system of FIG. 1, the angler, upon hooking a fish, activates the electric motor 14, via the remote switch 11, to drive the reel to begin reeling in the transducer 15 from the hole.

Although the conventional system of FIG. 1 provides a solution to removing the transducer from the hole, the conventional system requires a power source such as a battery, which loses its power quickly in cold conditions, thereby causing the operational life of the conventional system to be shorter in colder conditions.

Moreover, by utilizing an electric motor and a battery, the weight of the conventional system raises issues when the angler has to continually move the conventional system from hole to hole.

Therefore, it is desirable to provide a solution to removing the transducer from the hole which does not reply upon a power source such as a battery.

In addition, it is desirable to provide a solution to removing the transducer from the hole, which is light so that the angler can easily move the system from hole to hole.

Moreover, it is desirable to provide a solution that does not require using the angler's hand(s) to remove the transducer from the hole or operate the system that removes the transducer from the hole.

BRIEF DESCRIPTION OF THE DRAWINGS

The drawings are only for purposes of illustrating various embodiments and are not to be construed as limiting, wherein.

DETAILED DESCRIPTION

Figure 1:
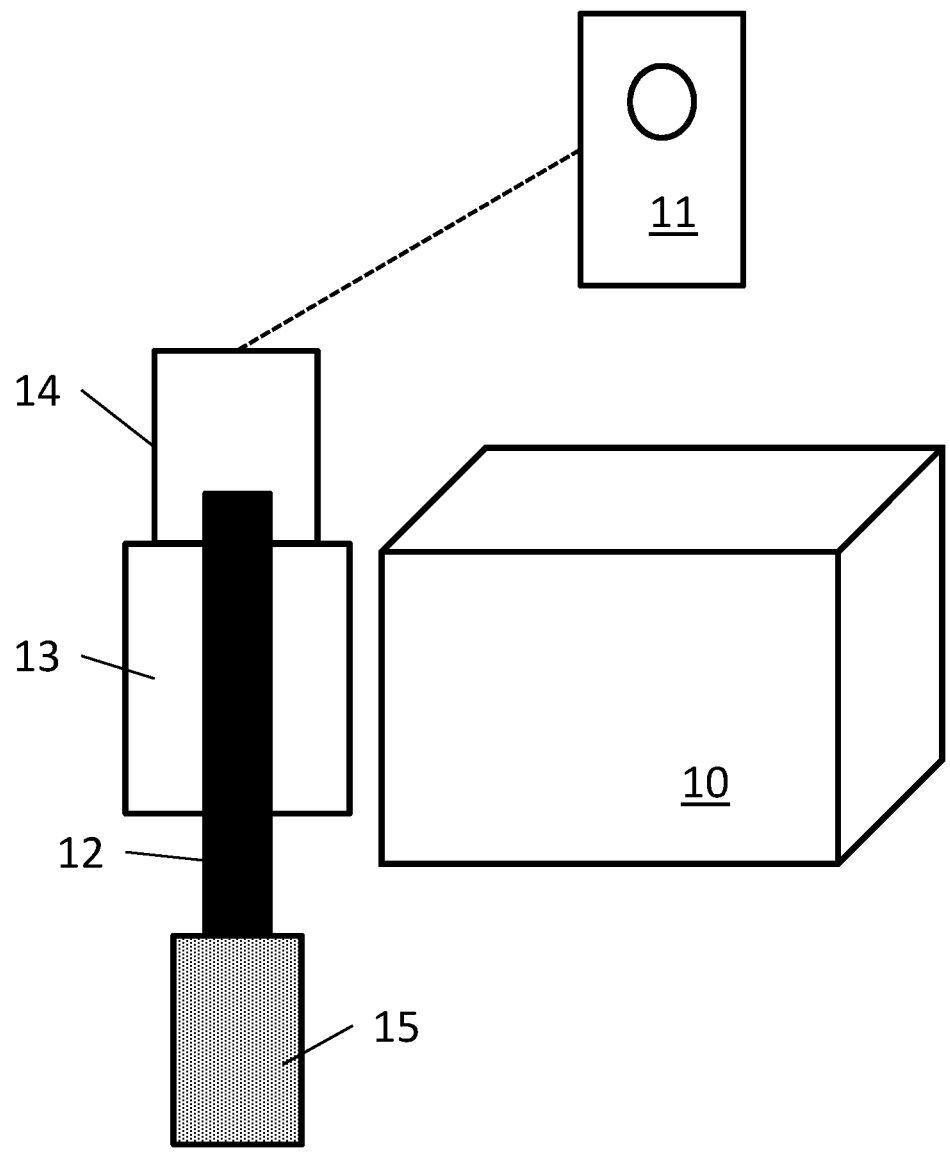
FIG. 1 shows a block diagram of a conventional fish finding transducer lifter.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 2:
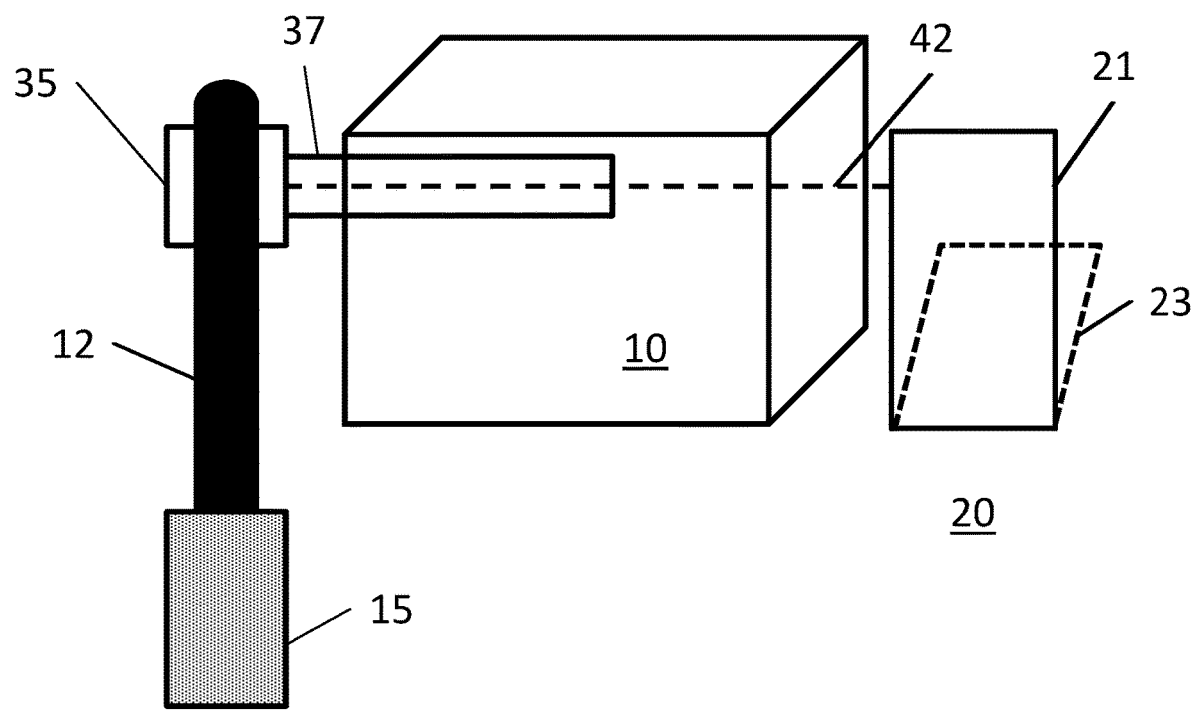
FIG. 2 illustrates a front view of a fish finding transducer lifter.

FIG. 2 illustrates a front view of a fish finding transducer lifter. As illustrated in FIG. 2, the fish finding transducer lifter includes a mechanical actuating device 20, which includes an actuator (pedal) 21 and a stabilizing member 23. In the example, illustrated by FIG. 2, when an angler steps upon the actuator (pedal) 21, a transducer 15, associated with an electronic fish finder 10, is lifted from the hole in the ice.

The actuator (pedal) 21 may be hinged to the stabilizing member 23, or connected, via a pin, to allow the rotational movement of the actuator (pedal) 21 while the stabilizing member 23 remains stationary.

Moreover, as illustrated in FIG. 2, the fish finding transducer lifter includes a transducer lifting member 35, upon which a cable 12, connected to the transducer 15, is seated. The transducer lifting member 35 is physically connected to the electronic fish finder 10, via fish finder attachment member 37. The fish finder attachment member 37 holds the center of rotation of the transducer lifting member 35 at a horizontal and vertically stable position. The connection between the transducer lifting member 35 and fish finder attachment member 37 is a rotatable connection, thereby allowing the transducer lifting member 35 to rotate around the connection to lift and lower the transducer 15.

The fish finder attachment member 37 is configured to interface with the unique contours of the electronic fish finder 10. The fish finder attachment member 37 may include slots for receiving projecting members of the electronic fish finder 10; e.g., slots to receive the bolts attaching the face of the electronic fish finder 10 to the electronic fish finder 10; and/or clips to snap onto surfaces of the electronic fish finder 10; e.g., a clip to engage a handle portion of the electronic fish finder 10. The fish finder attachment member 37 may also be shaped to fit within recesses of the electronic fish finder 10; e.g., the recess between a handle portion of the electronic fish finder 10 and the face of the electronic fish finder 10. In other words the fish finder attachment member 37 is configured differently, depending upon the electronic fish finder 10 being used.

The mechanical actuating device 20 is mechanically connected to the transducer lifting member 35, via mechanical linkage 42. The mechanical linkage 42 transfer the force applied to the mechanical actuating device 20 to the transducer lifting member 35. The mechanical linkage 42 may be a cable.

For example, as illustrated in FIG. 2, when an angler steps upon the actuator (pedal) 21, the mechanical linkage 42 moves so that a front portion of the transducer lifting member 35 is raised, thereby lifting the transducer 15 out of the hole.

To put the transducer 15 back in the hole, either the transducer lifting member 35 is lowered (raising the actuator (pedal) 21) or the actuator (pedal) 21 is raised (lowering the transducer lifting member 35).

Figure 3:
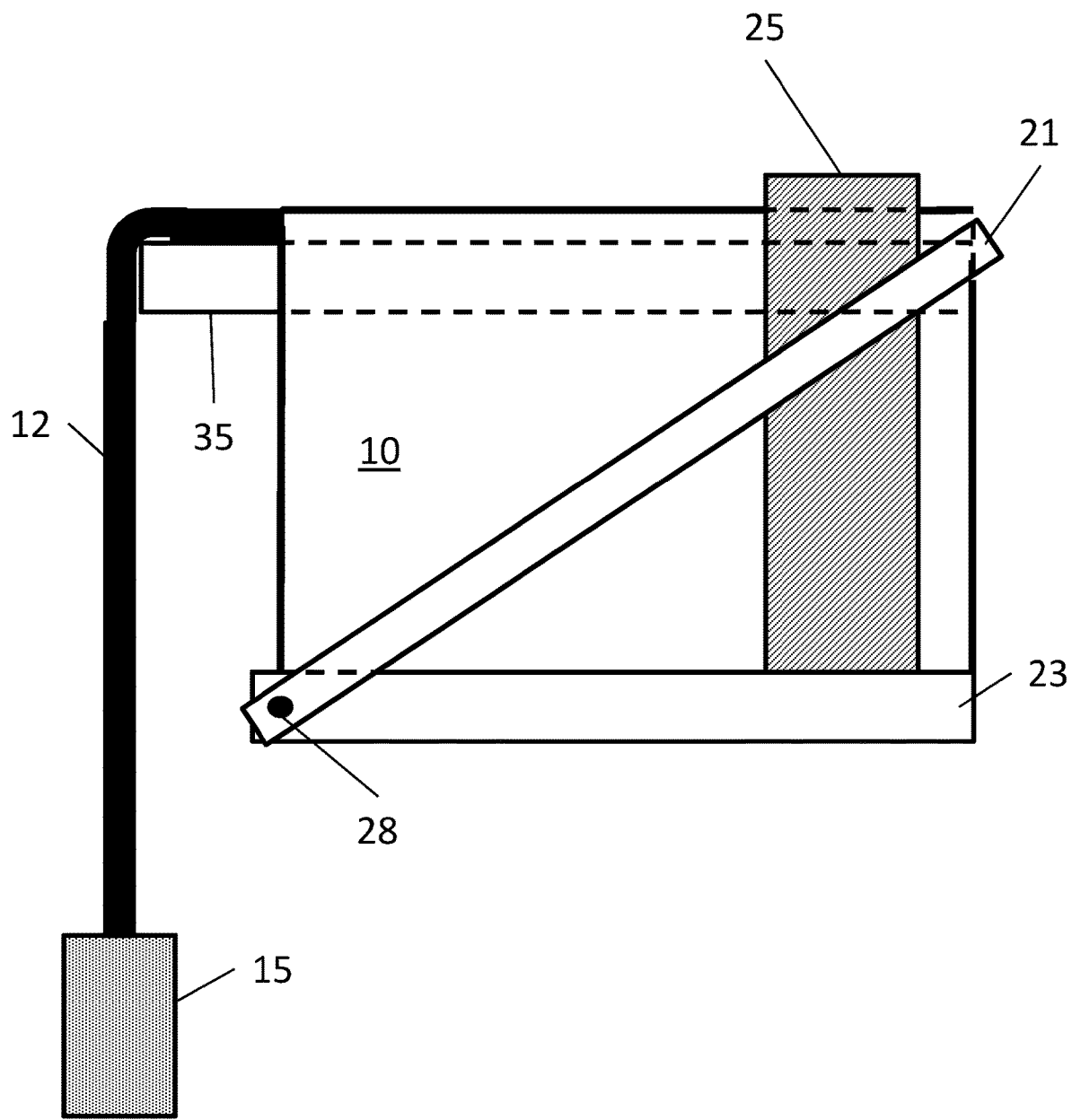
FIG. 3 illustrates a first side view of the fish finding transducer lifter of FIG. 2.

FIG. 3 illustrates a first side view of the fish finding transducer lifter of FIG. 2. As illustrated in FIG. 3, the fish finding transducer lifter includes mechanical actuating device 20, which includes an actuator (pedal) 21 and a stabilizing member 23. The mechanical actuating device 20, as illustrated in FIG. 3, may include a vertical member 25 to secure, in one embodiment, the mechanical linkage (not shown).

In the example, illustrated by FIG. 3, when an angler steps upon the actuator (pedal) 21, a transducer 15, associated with an electronic fish finder 10, is lifted from the hole in the ice by transducer lifting member 35. The actuator (pedal) 21 may be hinged to the stabilizing member 23, or connected, via a pin 28, to allow the rotational movement of the actuator (pedal) 21 while the stabilizing member 23 remains stationary.

As illustrated in FIG. 3, the fish finding transducer lifter is in a state wherein the transducer 15 is lowered or in the hole in the ice; e.g., the actuator (pedal) 21 is raised and the transducer lifting member 35 is lowered.

Figure 4:
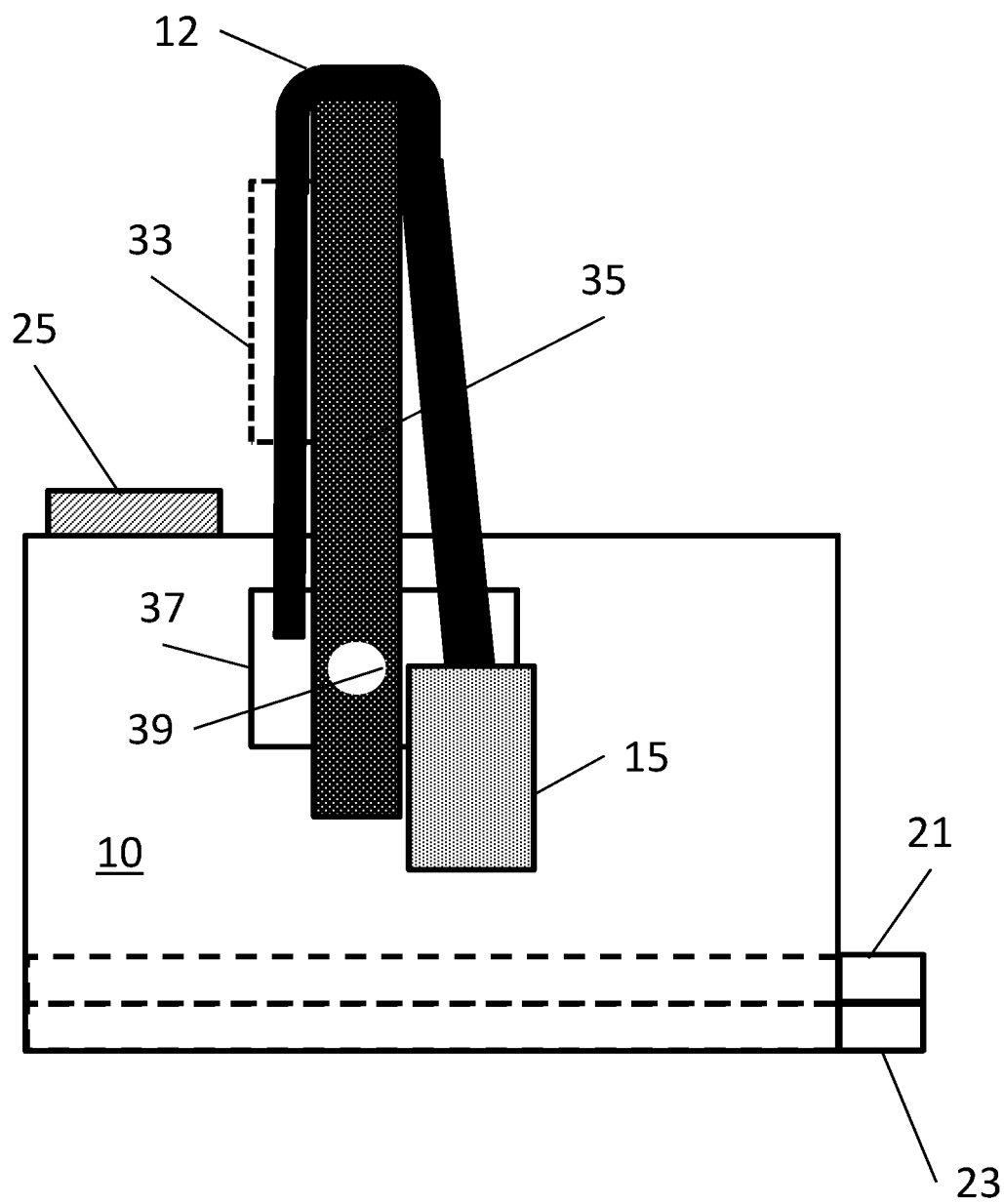
FIG. 4 illustrates a second side view of the fish finding transducer lifter of FIG. 2.

FIG. 4 illustrates a second side view of the fish finding transducer lifter of FIG. 2. As illustrated in FIG. 4, the fish finding transducer lifter includes transducer lifting member 35, upon which cable 12, connected to the transducer 15, is seated. The transducer lifting member 35 is physically connected to the electronic fish finder 10, via fish finder attachment member 37. The fish finder attachment member 37 holds the center of rotation 39 of the transducer lifting member 35 at a horizontal and vertically stable position. The connection 39 between the transducer lifting member 35 and fish finder attachment member 37 is a rotatable connection, thereby allowing the transducer lifting member 35 to rotate around the connection to lift and lower the transducer 15.

The fish finding transducer lifter may include a clip 33 that holds (secures) cable 12 to the transducer lifting member 35, such that the cable 12 is located between the transducer lifting member 35 and an interior surface of the clip 33.

As illustrated in FIG. 4, the fish finding transducer lifter is in a state wherein the transducer 15 is raised or out of the hole in the ice; e.g., the actuator (pedal) 21 is lowered and the transducer lifting member 35 is raised.

Figure 5:
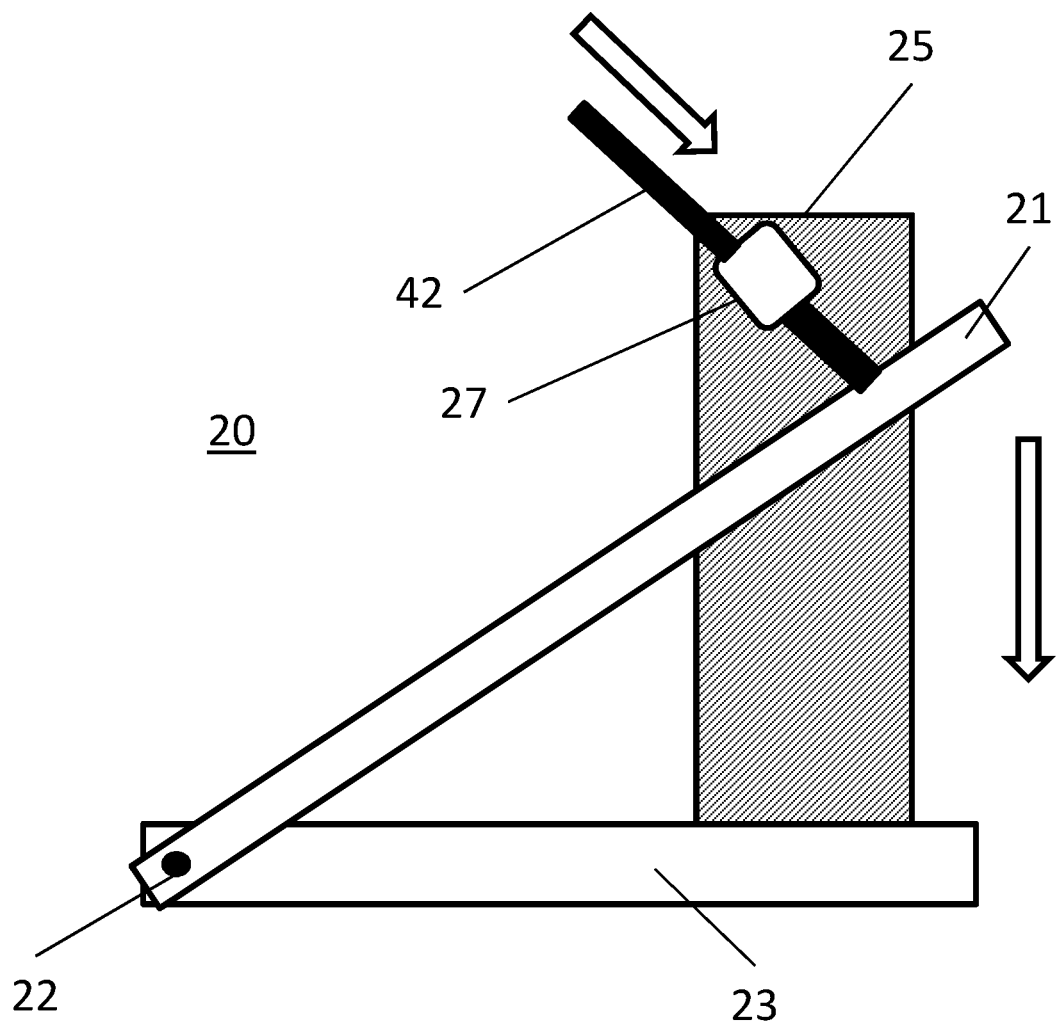
FIG. 5 illustrates one example of a mechanical actuating device of the fish finding transducer lifter of FIG. 2.

FIG. 5 illustrates one example of a mechanical actuating device of the fish finding transducer lifter of FIG. 2. As illustrated in FIG. 5, the mechanical linkage 42 is secured, via mechanical linkage holder 27, to vertical member 25. The mechanical linkage 42 is also connected to the actuator (pedal) 21 such when the actuator (pedal) 21 is lowered, the mechanical linkage 42 is pulled downwardly.

Figure 7:
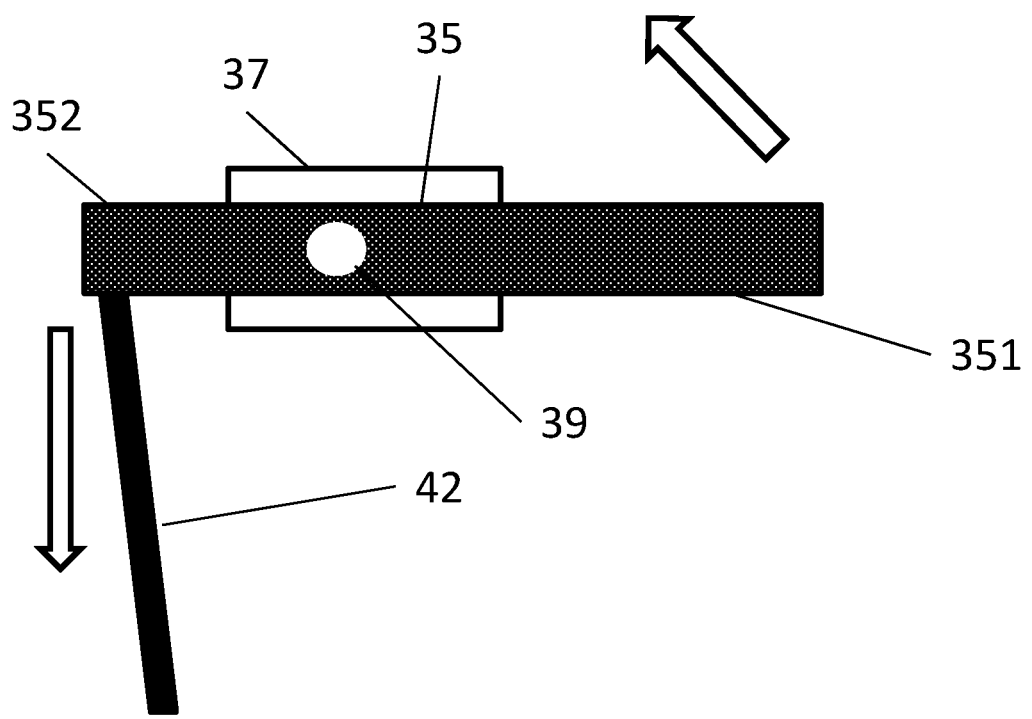
FIG. 7 illustrates one example of a transducer lifter of the fish finding transducer lifter of FIG. 2.

If the other end of the mechanical linkage 42 is connected to a back portion of the transducer lifting member, as illustrated in FIG. 7, the back portion of the transducer lifting member will be pulled down by the mechanical linkage 42, thereby lifting the front portion of the transducer lifting member.

However, if the other end of the mechanical linkage 42 is connected to a front portion of the transducer lifting member, the front portion of the transducer lifting member will be pulled up by the mechanical linkage 42, thereby lifting the front portion of the transducer lifting member.

Figure 6:
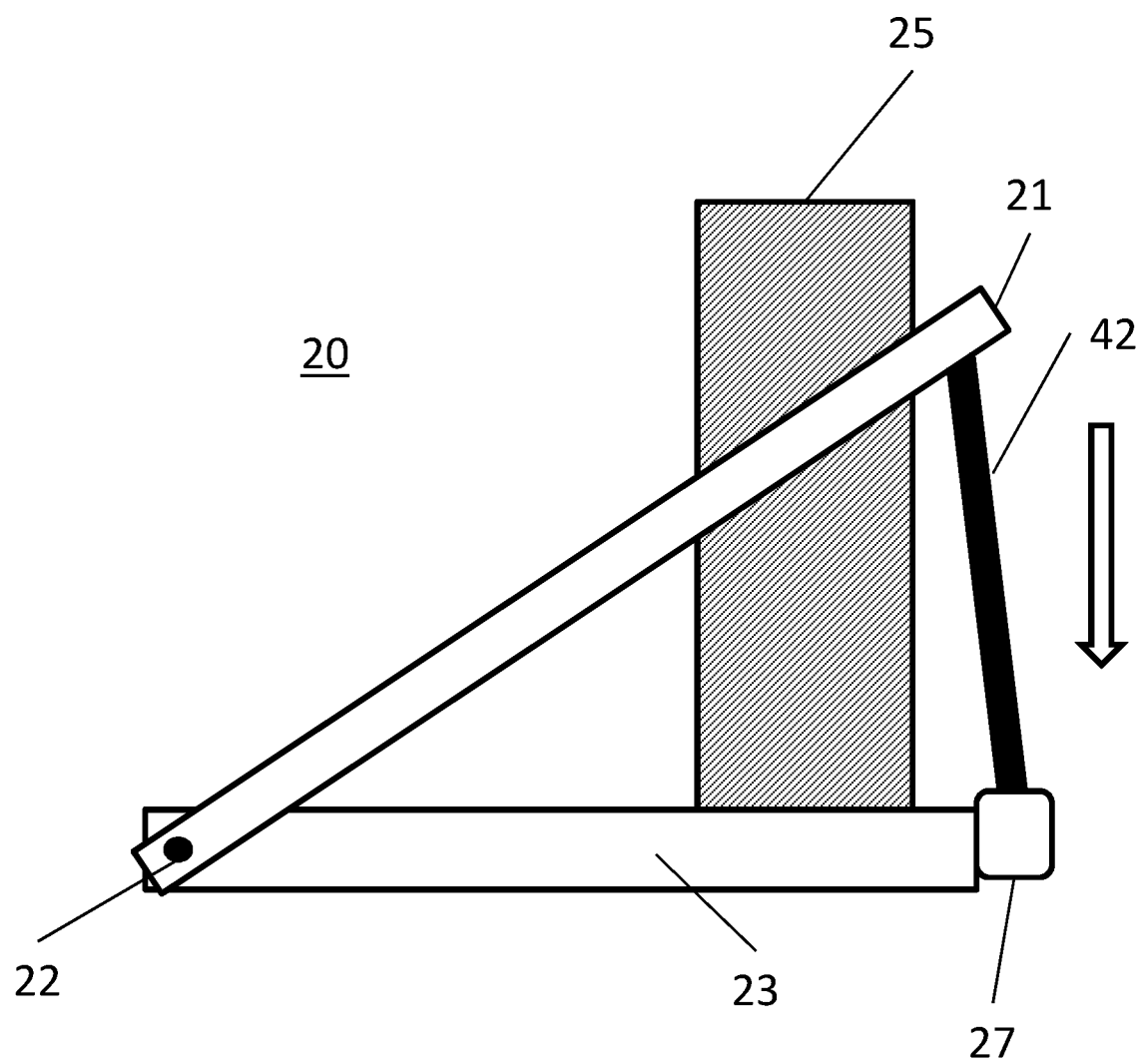
FIG. 6 illustrates another example of a mechanical actuating device of the fish finding transducer lifter of FIG. 2.

FIG. 6 illustrates another example of a mechanical actuating device of the fish finding transducer lifter of FIG. 2. As illustrated in FIG. 6, the mechanical linkage 42 is secured, via mechanical linkage holder 27, to stabilizing member 23. The mechanical linkage 42 is also connected to the actuator (pedal) 21 such when the actuator (pedal) 21 is lowered, the mechanical linkage 42 is pushed downwardly.

If the other end of the mechanical linkage 42 is connected to a back portion of the transducer lifting member, the back portion of the transducer lifting member will be pushed down by the mechanical linkage 42, thereby lifting the front portion of the transducer lifting member.

Figure 8:
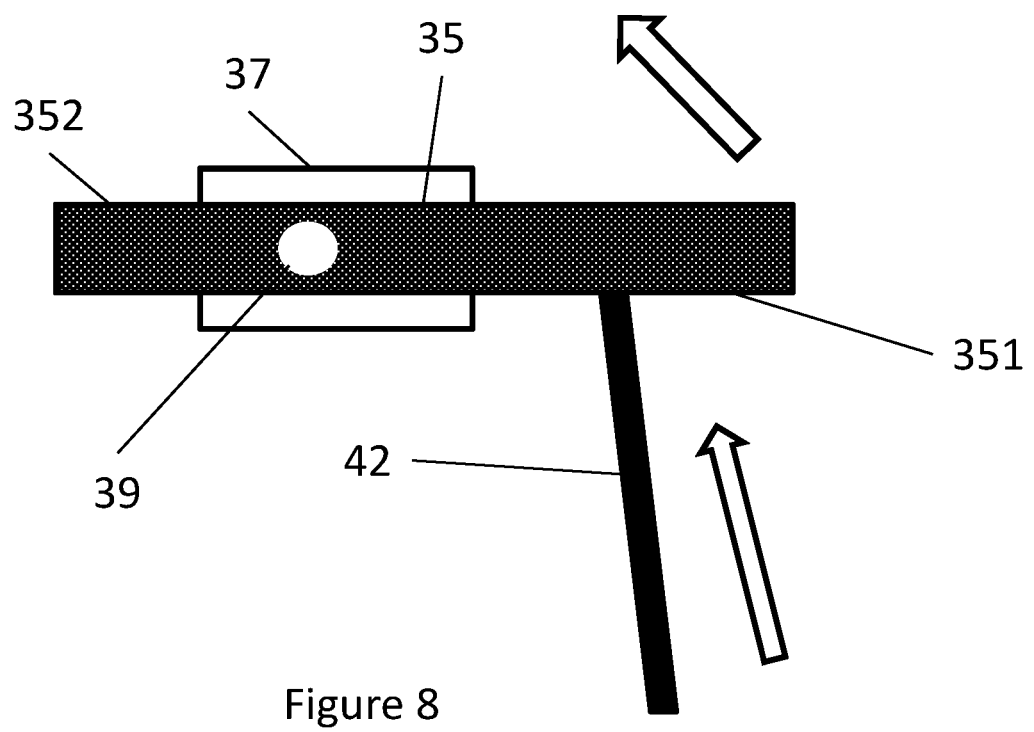
FIG. 8 illustrates another example of a transducer lifter of the fish finding transducer lifter of FIG. 2.

However, if the other end of the mechanical linkage 42 is connected to a front portion of the transducer lifting member, as illustrated in FIG. 8, the front portion of the transducer lifting member will be pushed up by the mechanical linkage 42, thereby lifting the front portion of the transducer lifting member.

FIG. 7 illustrates one example of a transducer lifter of the fish finding transducer lifter of FIG. 2. As illustrated in FIG. 7, the mechanical linkage 42 is connected to a back portion 352 of the transducer lifting member 35 such that the back portion 352 of the transducer lifting member 35 will be pulled down by the mechanical linkage 42, thereby lifting the front portion 351 of the transducer lifting member 35.

FIG. 8 illustrates another example of a transducer lifter of the fish finding transducer lifter of FIG. 2. As illustrated in FIG. 8, the mechanical linkage 42 is connected to a front portion 351 of the transducer lifting member 35 such that the front portion 351 of the transducer lifting member 35 will be pushed up by the mechanical linkage 42, thereby lifting the front portion 351 of the transducer lifting member 35.

Figure 9:
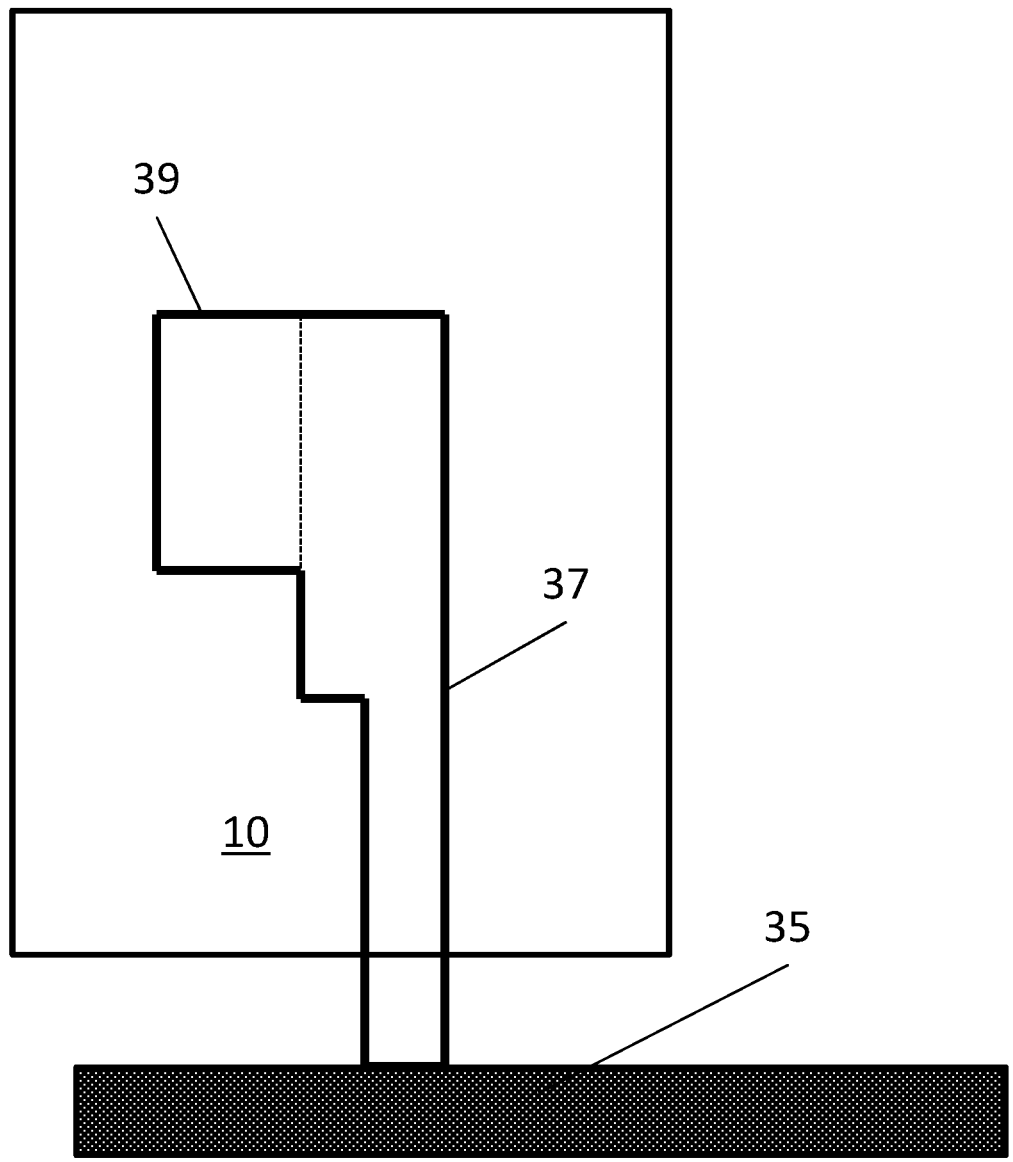
FIG. 9 illustrates an example of an attachment member for the fish finding transducer lifter of FIG. 2.

FIG. 9 illustrates an example of an attachment member for the fish finding transducer lifter of FIG. 2. As illustrated in FIG. 9, the fish finder attachment member 37 may include a clip 39 to secure the fish finder attachment member 37 to the electronic fish finder 10.

As noted above, the fish finder attachment member 37 is configured to interface with the unique contours of the electronic fish finder 10. The fish finder attachment member 37 may include slots for receiving projecting members of the electronic fish finder 10; e.g., slots to receive the bolts attaching the face of the electronic fish finder 10 to the electronic fish finder 10; and/or clips to snap onto surfaces of the electronic fish finder 10; e.g., clip 39 to engage a handle portion of the electronic fish finder 10. The fish finder attachment member 37 may also be shaped to fit within recesses of the electronic fish finder 10; e.g., the recess between a handle portion of the electronic fish finder 10 and the face of the electronic fish finder 10. In other words the fish finder attachment member 37 is configured differently, depending upon the electronic fish finder 10 being used.

Figure 10:
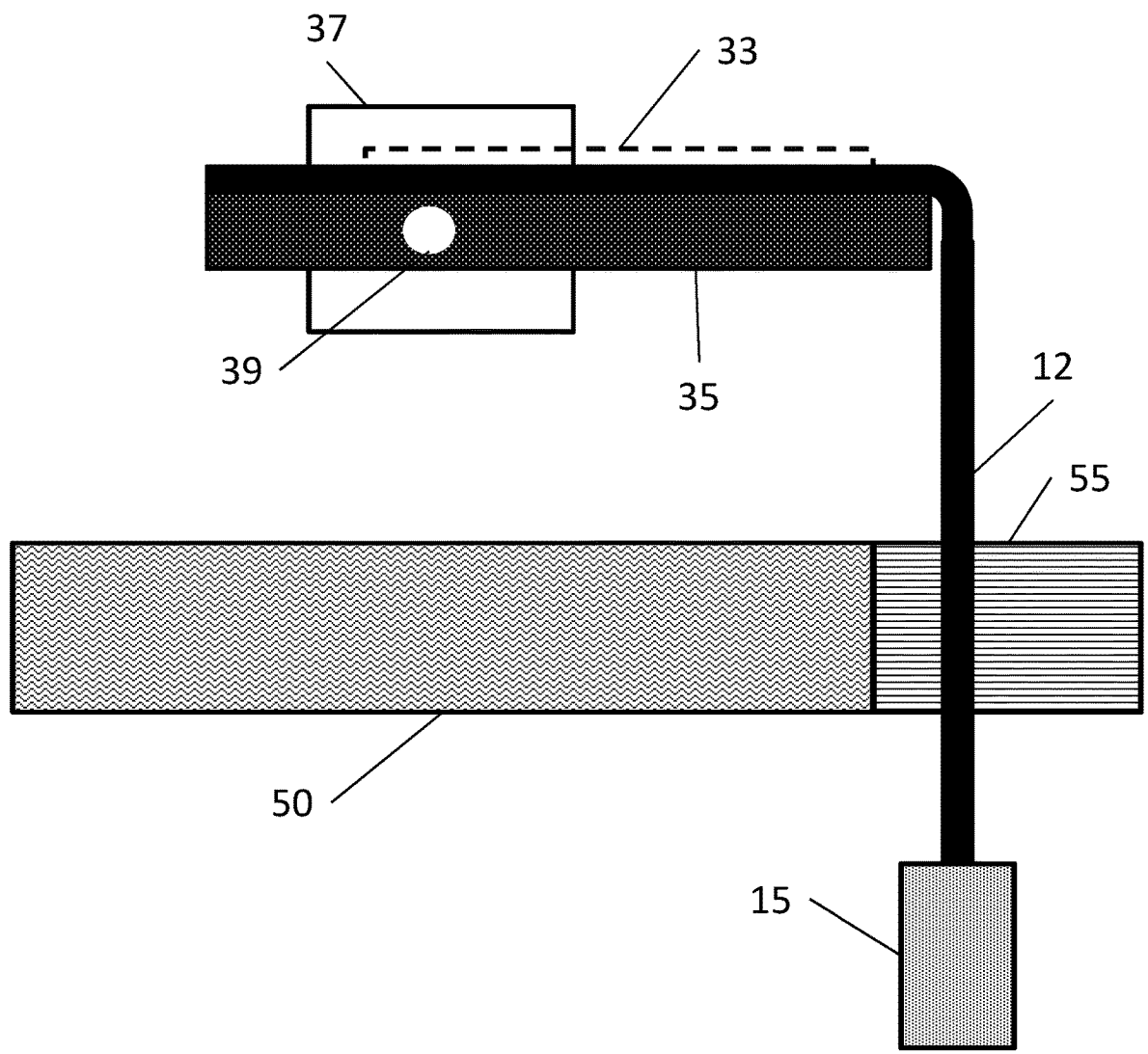
FIG. 10 illustrates a side view of the fish finding transducer lifter of FIG. 2 with the transducer in the hole in the ice.

FIG. 10 illustrates a side view of the fish finding transducer lifter of FIG. 2 with the transducer in the hole in the ice. As illustrated in FIG. 10, the state of the fish finding transducer lifter is where the transducer lifting member 35 is lowered such that the transducer 15 is in the hole 55 in the ice 50. As illustrated, the cable 12 may be secured to the transducer lifting member 35 via clip 33.

Figure 11:
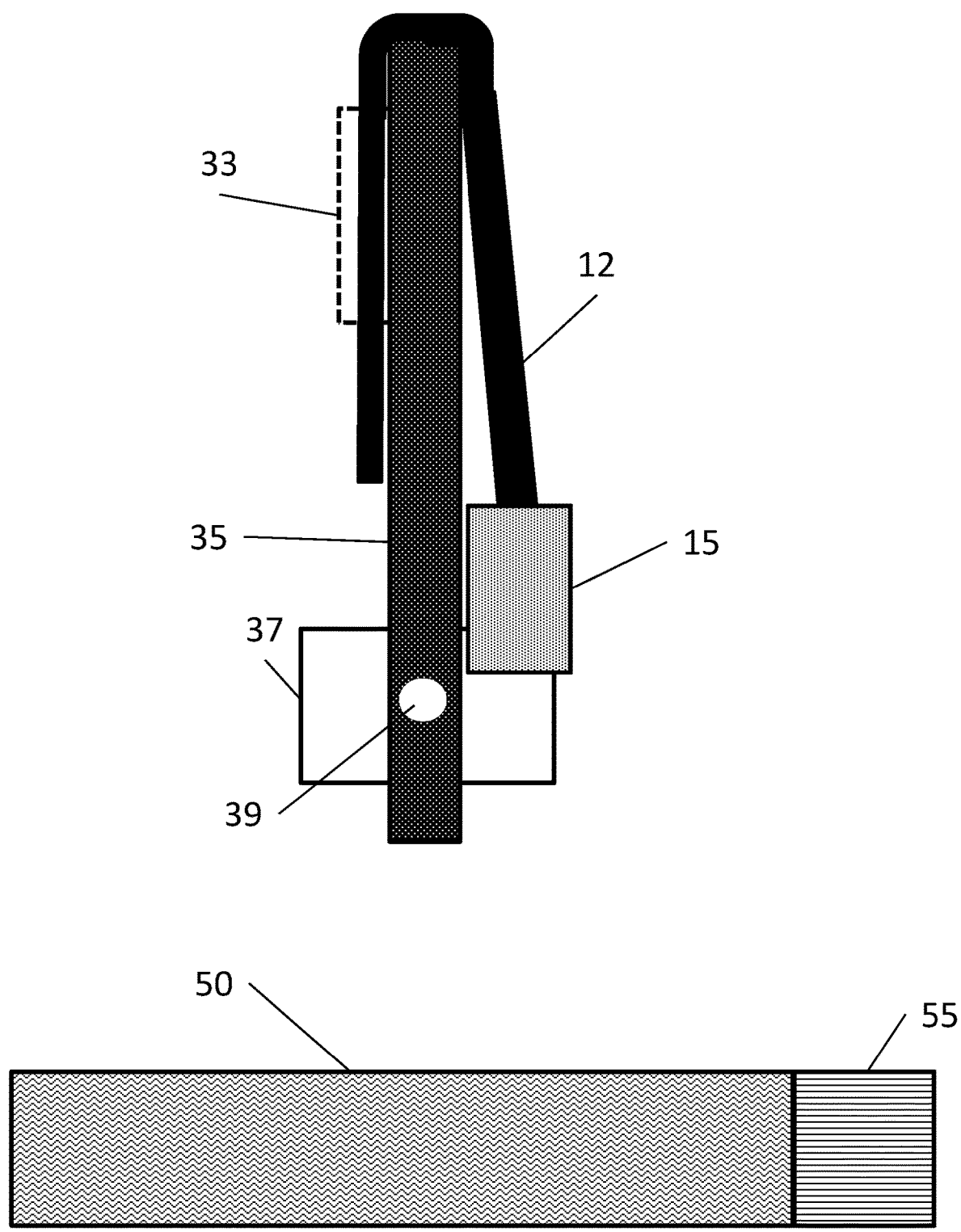
FIG. 11 illustrates a side view of the fish finding transducer lifter of FIG. 2 with the transducer lifted from the hole in the ice.

FIG. 11 illustrates a side view of the fish finding transducer lifter of FIG. 2 with the transducer lifted from the hole in the ice. As illustrated in FIG. 11, the state of the fish finding transducer lifter is where the transducer lifting member 35 is raised such that the transducer 15 is not in the hole 55 in the ice 50. As illustrated, the cable 12 may be secured to the transducer lifting member 35 via clip 33.

An electronic fish finder transducer lifting system, comprises a mechanical actuating device; a transducer lifting device; an electronic fish finder attachment member, rotatably connected to the transducer lifting device, configured to attach to an electronic fish finder; and a mechanical linkage, connected to the mechanical actuating device and the transducer lifting device, configured to transfer force, applied to the mechanical actuating device, to the transducer lifting device to lift a front portion of the transducer lifting device.

The mechanical actuating device may include a pedal hinged to a stabilizing member.

The electronic fish finder transducer lifting system may further comprise a clip to secure a cable associated with a transducer of the electronic fish finder.

The mechanical linkage may be a cable.

The mechanical linkage may be connected to a back portion of the transducer lifting device and is configured such that when a downward force is applied to the mechanical actuating device, the mechanical linkage pulls down the back portion of the transducer lifting device to lift a front portion of the transducer lifting device.

The mechanical linkage may be connected to a front portion of the transducer lifting device and is configured such that when a downward force is applied to the mechanical actuating device, the mechanical linkage pulls up the front portion of the transducer lifting device to lift the front portion of the transducer lifting device.

The mechanical linkage may be connected to a back portion of the transducer lifting device and is configured such that when a downward force is applied to the mechanical actuating device, the mechanical linkage pushes down the back portion of the transducer lifting device to lift a front portion of the transducer lifting device.

The mechanical linkage may be connected to a front portion of the transducer lifting device and is configured such that when a downward force is applied to the mechanical actuating device, the mechanical linkage pushes up the front portion of the transducer lifting device to lift the front portion of the transducer lifting device.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. An electronic fish finder transducer lifting system, comprising:
   a mechanical actuating device including an actuator;
   a transducer lifting device having a front portion and a back portion;
   an electronic fish finder attachment member, rotatably connected to said transducer lifting device, configured to attach to an electronic fish finder; and
   a mechanical linkage mechanically connected to said mechanical actuating device and said transducer lifting device;
   said mechanical linkage being configured to transfer force; applied to said actuator to said transducer lifting device so as to lift a said front portion of said transducer lifting device.

2. The electronic fish finder transducer lifting system, as claimed in claim 1, wherein said actuator includes a pedal hinged to a stabilizing member.

3. The electronic fish finder transducer lifting system, as claimed in claim 1, further comprising a clip to secure a cable associated with a transducer of the electronic fish finder.

4. The electronic fish finder transducer lifting system, as claimed in claim 1, wherein said mechanical linkage is a cable.

5. The electronic fish finder transducer lifting system, as claimed in claim 1, wherein said mechanical linkage is connected to a said back portion of said transducer lifting device and is configured such that when a downward force is applied to said actuator, said mechanical linkage pulls down said back portion of said transducer lifting device to lift a said front portion of said transducer lifting device.

6. The electronic fish finder transducer lifting system, as claimed in claim 1, wherein said mechanical linkage is connected to a said front portion of said transducer lifting device and is configured such that when a downward force is applied to said actuator, said mechanical linkage pulls up said front portion of said transducer lifting device to lift said front portion of said transducer lifting device.

7. The electronic fish finder transducer lifting system, as claimed in claim 1, wherein said mechanical linkage is connected to a said back portion of said transducer lifting device and is configured such that when a downward force is applied to said actuator, said mechanical linkage pushes down said back portion of said transducer lifting device to lift a said front portion of said transducer lifting device.

8. The electronic fish finder transducer lifting system, as claimed in claim 1, wherein said mechanical linkage is connected to a said front portion of said transducer lifting device and is configured such that when a downward force is applied to said actuator, said mechanical linkage pushes up said front portion of said transducer lifting device to lift said front portion of said transducer lifting device.

9. An electronic fish finder transducer lifting system, comprising:

a mechanical actuating device including a pedal hinged to a stabilizing member;

a transducer lifting device;

an electronic fish finder attachment member, rotatably connected to said transducer lifting device, configured to attach to an electronic fish finder; and a mechanical linkage, connected to said mechanical actuating device and said transducer lifting device, configured to transfer force applied to said mechanical actuating device, to said transducer lifting device to lift a front portion of said transducer lifting device.

10. The electronic fish finder transducer lifting system, as claimed in claim 9, further comprising a clip to secure a cable associated with a transducer of the electronic fish finder.

11. The electronic fish finder transducer lifting system, as claimed in claim 9, wherein said mechanical linkage is a cable.

12. The electronic fish finder transducer lifting system, as claimed in claim 9, wherein said mechanical linkage is connected to a back portion of said transducer lifting device and is configured such that when a downward force is applied to said mechanical actuating device, said mechanical linkage pulls down said back portion of said transducer lifting device to lift said front portion of said transducer lifting device.

13. The electronic fish finder transducer lifting system, as claimed in claim 9, wherein said mechanical linkage is connected to said front portion of said transducer lifting device and is configured such that when a downward force is applied to said mechanical actuating device, said mechanical linkage pulls up said front portion of said transducer lifting device to lift said front portion of said transducer lifting device.

14. The electronic fish finder transducer lifting system, as claimed in claim 9, wherein said mechanical linkage is connected to a back portion of said transducer lifting device and is configured such that when a downward force is applied to said mechanical actuating device, said mechanical linkage pushes down said back portion of said transducer lifting device to lift said front portion of said transducer lifting device.

15. The electronic fish finder transducer lifting system, as claimed in claim 9, wherein said mechanical linkage is connected to said front portion of said transducer lifting device and is configured such that when a downward force is applied to said mechanical actuating device, said mechanical linkage pushes up said front portion of said transducer lifting device to lift said front portion of said transducer lifting device.

16. A system, comprising:

a mechanical actuating device including a pedal hinged to a stabilizing member;

a transducer lifting device; and a mechanical linkage, connected to said mechanical actuating device and said transducer lifting device, configured to transfer force applied to said mechanical actuating device, to said transducer lifting device to lift a front portion of said transducer lifting device;

said mechanical linkage is connected to a back portion of said transducer lifting device and is configured such that when a downward force is applied to said mechanical actuating device, said mechanical linkage pulls down said back portion of said transducer lifting device to lift said front portion of said transducer lifting device.

* * * * *